Patented May 11, 1943

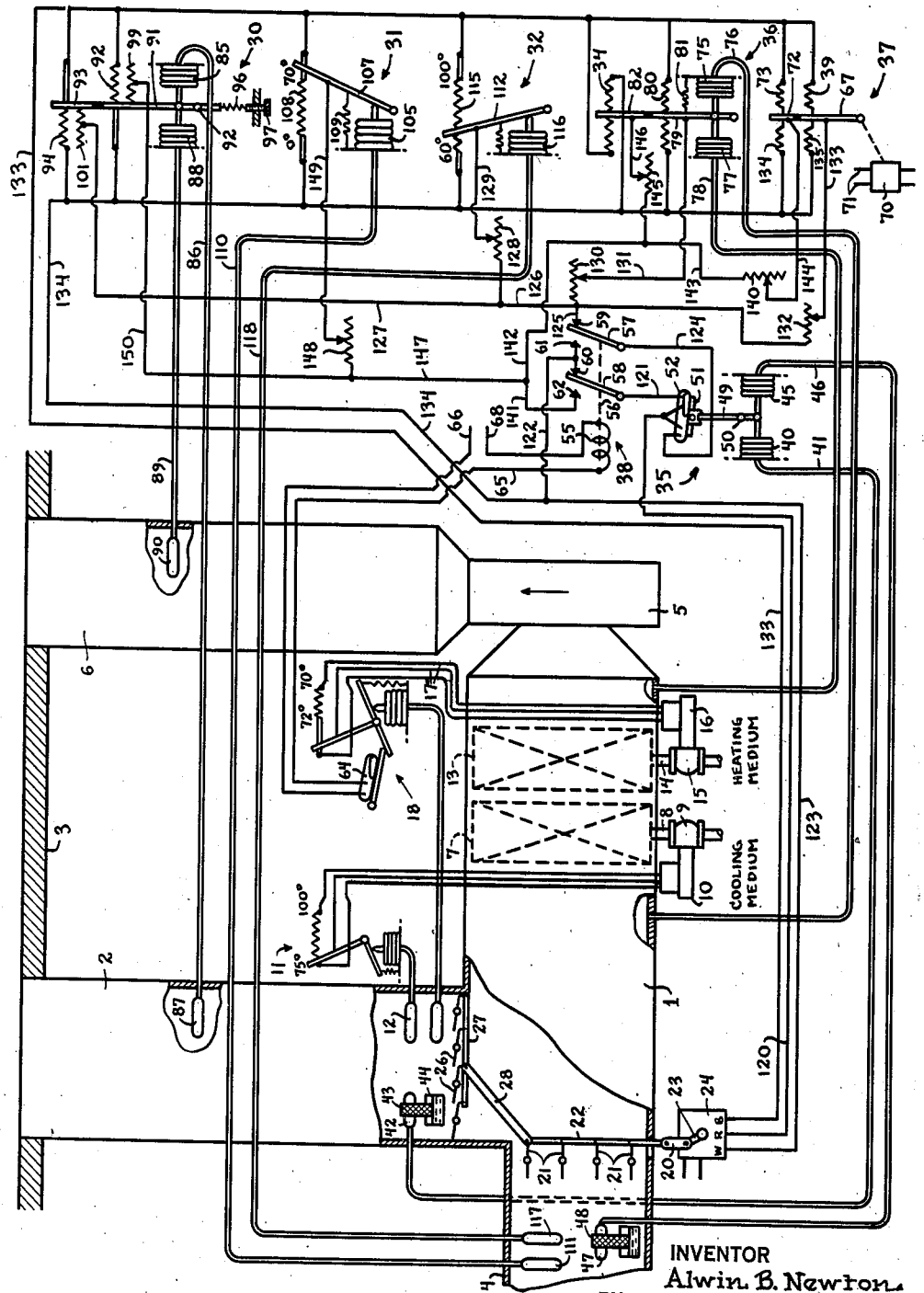

2,318,706

UNITED STATES PATENT OFFICE 2,318,706

AIR CONDITIONING SYSTEM

Alwin B. Newton, Minneapolis, Minn., assignor to Minneapolis-Honeywell Regulator Company, Minneapolis, Minn., a corporation of Delaware Application January 27, 1941, Serial No. 376,034

17 Claims. (Cl. 257—3)

This invention relates in general to air conditioning and more particularly to the control of the supply of fresh air to an enclosure occupied by humans in accordance with the number of occupants in the enclosure.

The primary object of this invention is to provide a relatively simple control system for a fresh air damper or flow controller which varies the supply of fresh air to an enclosure in accordance with the number of occupants in the enclosure.

A further object of this invention is to provide a fresh air control system which maintains the flow of fresh air at a maximum whenever its condition is such that it aids in conditioning the space, but which reduces the flow of fresh air to an amount dependent upon the occupancy of the enclosure when the condition of the fresh air is such that it does not aid in maintaining desired conditions in the enclosure.

Another object of this invention consists in the provision of a fresh air control system which controls the flow of fresh air in response to a condition influenced by the occupancy of the space and another variable factor, compensation being made for variations in such other factor whereby the fresh air is controlled in accordance with the occupancy of the space.

Other objects will appear from the following description and appended claims.

For a full disclosure of the invention, reference is made to the following detailed description and to the accompanying drawing, the single figure of which illustrates diagrammatically an air conditioning system embodying the features of the invention.

Referring to the drawing, reference character 1 indicates an air conditioning chamber, this chamber being connected by a return air duct 2 with a conditioned space, one wall of which is shown at 3. This chamber is also provided with a fresh air duct 4 for delivering fresh air to the space for ventilation purposes. The outlet end of chamber 1 is connected to a fan 5 which is in turn connected by a discharge duct 6 to the conditioned space 3. Located in chamber 1 is a cooling coil 7, this coil being provided with a supply pipe 8 for cooling medium, this supply pipe having interposed therein a valve 9 which is actuated by a proportioning motor 10. This proportioning motor is preferably of the type shown in the Taylor Patent 2,028,110 and is adapted to assume intermediate positions depending upon the demand of a potentiometer type return air thermostat 11. This thermostat 11 is provided with a control bulb 12 located in the return air duct 2 and therefore responds to the temperature of the air in the conditioned space. This thermostat may be set so as to graduatingly open the valve 10 as the return air temperature rises above 75° F. Also located in chamber 1 is a heating coil 13, this coil being provided with a supply pipe 14 and a valve 15 positioned by a proportioning motor 16. This motor 16 is connected by a control line 17 to a return air thermostat 18 which is of the potentiometer type. This thermostat 18 may be set so as to begin opening the valve 15 when the return air temperature falls below 72° F. From the description thus far, it will be apparent that when space temperature falls below 72° F. the heating coil 13 is graduatingly placed into operation an amount necessary to maintain the desired space temperature. Also, it will be apparent that when space temperature rises above 75° F., the cooling coil valve will be graduatingly opened an amount necessary to maintain the space temperature at the desired value. Between 72° F. and 75° F., both the heating coil and cooling coil are out of operation.

Located in the fresh air duct 4 is a fresh air damper which consists of a plurality of blades 21 connected together by an operating member 22 which is, in turn, connected to the crank arm 23 of a proportioning motor 24 by a link 20. Located in the return air duct 2 is a return air damper consisting of a plurality of blades 26 connected together by a member 27. The members 22 and 27 are connected together by a cross connection 28 which is arranged so as to cause the fresh and return air dampers to be actuated in unison but in opposite directions by the proportioning motor 24. Upon counter-clockwise rotation of the crank arm 23, the fresh air damper will close and the return air damper open, and upon opposite rotation of crank arm 23 the dampers will rotate in the opposite directions. The fresh air damper motor 24 is preferably of the electric proportioning type shown and described in the Taylor Patent 2,028,110. Upon reference to this patent it will be found that the proportioning motor is provided with a three wire control circuit, the control terminals for such circuit being indicated as R, W and B. This motor is adapted to assume intermediate positions depending upon the relative values of resistance connected between terminals R and W and between terminals R and B. For example, when equal values of resistance are connected across terminals R and W and across terminals R and B, the motor will assume mid position wherein the fresh and return air dampers are each half open. If the resistance between terminals R and W is decreased without corresponding decrease in resistance between terminals R and B, the motor will rotate to a position for opening the fresh air damper and closing the return air damper, the amount of rotation being dependent upon the change in resistance in the control circuit. Conversely, if the resistance between terminals R and B is decreased without corresponding decrease in resistance between terminals R and W, the lever 23 will rotate counter-clockwise for closing the fresh air damper and opening the return air damper an amount proportionate to the change in resistance.

The proportioning motor 24 is controlled by means of a differential controller 30 which responds to the difference in temperature between the return air and discharge air, an outside temperature responsive thermostat 31, an outside temperature responsive thermostat 32, a differential thermostat 35 responding to the difference in temperature between outside and return air, an air flow responsive device 36, a lighting load responsive device 37 and a relay 38.

The differential thermostat 35 includes a bellows 40 which is connected by a capillary tube 41 with a control bulb 42 located in the return air duct 2. This control bulb 42 may be provided with a wick 43, a part of which is immersed in a water pan 44 for causing the bulb 42 to respond to the wet bulb temperature of the return air. The controller 35 also includes a second bellows 45 which is connected by a capillary tube 46 to a control bulb 47 located in the fresh air duct 4. This control bulb may likewise be provided with a wick 48 for causing it to respond to the wet bulb temperature of the fresh air. The bellows, tubes and bulbs are charged with a suitable volatile fill and are arranged so as to act in opposition upon a lever 49 which is pivoted at 50 and position this lever in accordance with the difference between outside and return air temperature. This lever 49 actuates a mercury switch carrier 51 which carries a mercury switch 52 having right-hand electrodes and left-hand electrodes. When the outside wet bulb temperature is lower than the inside wet bulb temperature, the bellows 40 produces a greater force than the bellows 45 which rotates the upper end of the lever 49 counter-clockwise which tilts the mercury switch 52 for bridging its right-hand electrodes. When outside wet bulb temperature is higher than inside wet bulb temperature, the opposite action occurs for tilting the mercury switch in a manner to bridge its left-hand electrodes.

The relay 38 may be of any desired construction and is shown diagrammatically as including a pull-in coil 55 which operates through an armature 56, a pair of switch arms 57 and 58, these arms cooperating with "out" contacts 59 and 60, respectively, and with "in" contacts 61 and 62, respectively. When coil 55 is energized, the switch arms 57 and 58 are caused to engage their "in" contacts 61 and 62. However, when the coil 55 is deenergized, the switch arms are moved under the action of gravity or springs, not shown, so as to engage their "out" contacts 59 and 60. This relay 38 is controlled by means of a switch 64 which is preferably actuated by the return air thermostat 18. This switch is arranged so as to close whenever the return air temperature falls below 72° F. while remaining open as long as the return air temperature is above such value. One end of the coil 55 is connected by wire 65 to one terminal of the switch 64 and the other terminal of this switch is connected to a supply wire 66. Another supply wire 68 is connected to the other end of coil 55. By this arrangement, it will be obvious that when the return air temperature falls below 72° F. the relay 38 will be energized while when the return air temperature is above 72° F. the relay will be deenergized as shown.

The lighting load responsive device 37 includes a watt meter 70 which is connected in the line wires 71 leading to the lights in the conditioned space. This watt meter is arranged in any suitable manner so as to actuate the sliders 67 and 72 which contact resistances 39 and 73 for forming a pair of potentiometers. Upon increase in lighting load, the sliders 67 and 72 are moved to the right across resistances 39 and 73, and upon decrease in lighting load they are moved in the opposite direction.

The air flow compensating device 36 includes a bellows 75 which is connected by a tube 76 to the conditioning chamber 1 in advance of coils 7 and 13. This device also includes a bellows 77 connected by a tube 78 to the conditioning chamber 1 downstream of the coils 7 and 13. The bellows 75 and 77 act in opposition upon a lever 79 which acts as a slider in cooperating with resistance 80 for forming a potentiometer. This slider is biased to the right by means of a biasing spring 81. Slider 79 also positions a slider 82 which cooperates with a resistance 34 for forming a second potentiometer. It will be apparent that the sliders 82 and 79 are positioned in accordance with the drop in pressure of the air in flowing through the coils 7 and 13, which drop in pressure is a measure of the air flow through the conditioning chamber. Upon an increase in air flow through the chamber 1, the pressure drop of the air in flowing through the coils 7 and 13 will increase, which causes the pressure in bellows 77 to fall in relation to the pressure in bellows 75, this causing movement of the sliders 79 and 82 to the left across resistances 80 and 34. Upon a reduction in air flow through the conditioner, the sliders 79 and 82 will be shifted to the right across their associated resistances.

The differential thermostat 30 includes a bellows 85 which is connected by a capillary tube 86 with a control bulb 87 located in the return air duct 2. This device also includes a bellows 88 connected by a capillary tube 89 to a control bulb 90 located in the discharge duct 6. The bellows 85 and 88 act in opposition upon a lever 91 which is pivoted at 92. Lever 91 acts as a slider cooperating with a resistance 92 and in turn operates a slider 93 cooperating with a resistance 94. The lower end of the lever 91 is connected to a spring 96 provided with an adjusting screw 97. This spring 96 biases the lever 91 in the vertical position shown and resists movement of this lever in either direction from this intermediate or vertical position. The slider 91 also contacts a center tapped corrector resistance 99. Similarly, the slider 93 also contacts a center tapped corrector resistance 101. When the return air temperature is equal to the discharge temperature, the pressures in bellows 85 and 88 will be equal. This causes the slider 91 to engage the left-hand ends of resistances 92 and 99 and causes the slider 93 to engage the right-hand ends of resistances 94 and 101. When the discharge temperature falls below the return air temperature, the pressure in bellows 88 will lower as compared to the pressure in bellows 85, which causes counter-clockwise rotation of sliders 91 and 93 against the biasing action of spring 96, this causing the slider 93 to move to the left across resistances 94 and 101. At this time the slider 91 disengages resistances 92 and 99. When the discharge temperature rises above the return air temperature, the slider 91 is forced clockwise against the action of spring 96 for causing slider 91 to move to the right across resistances 92 and 99. At this time, the slider 93 disengages resistances 94 and 101.

The outside thermostat 31 includes a bellows 105 which operates a slider 107 which engages a resistance 108 to form a potentiometer. The slider 107 is biased against bellows 105 by a spring 109. The bellows 105 is connected by a capillary tube 110 to a control bulb 111 located in the fresh air duct 4. The thermostat 31 therefore responds to outside temperature. Upon a decrease in outside temperature, the bellows 105 will contract due to the action of spring 109 which causes slider 107 to travel to the left across resistance 108. This instrument may be designed and adjusted so that the slider 107 engages the right-end end of resistance 108 when outside temperature is at 70° F. while engaging the left-hand end of said resistance when outside temperature falls to 0° F.

The thermostat 32 may be similar to thermostat 31 and includes a slider 112 cooperating with a resistance 115, this slider being actuated by a bellows 116 connected to a control bulb 117 by a capillary tube 118. This instrument may be designed and adjusted so that slider 112 engages the right-hand end of resistance 115 when outside temperature is at 100° F. and engages the left-hand end of the resistance when outside temperature is at 60° F.

The wiring between the various controls described above will be described in the following statement of operation.

*Operation*

With the parts in the position shown, the space temperature is about 75° F. and the relay 38 is deenergized. Also at this time the wet bulb temperature or total heat of the outside air is less than the wet bulb temperature or total heat of the return air as indicated by the right-hand electrodes of mercury switch 52 being bridged. Also at this time the return air temperature and discharge temperature are equal as indicated by the lever arm 91 of the differential controller 30 assuming its vertical position. The outside temperature is approximately 75° F. as indicated by the position of the slider 112 of thermostat 32. This position of the controls will only occur during the intermediate season when inside temperature is practically the same as outside temperature and when there is no occupancy load. Inasmuch as the total heat of the outside air is less than that of the inside air, it is desirable to provide a maximum amount of fresh air to the space. At this time, terminal R of the proportioning motor 24 is connected by wire 120, right-hand electrodes of mercury switch 52, wire 121, switch arm 58, contact 60 and wires 122 and 123, with terminal W of motor 24. This short circuiting of terminals R and W of motor 24 will cause it to assume an extreme position wherein the fresh air damper is wide open and the return air damper is closed to a minimum.

If the total heat of the outside air increases so that it becomes greater than the total heat of the return air, the mercury switch 52 of thermostat 35 will tilt so as to bridge its left-hand electrodes. Terminal R of motor 24 will now be connected by wire 120, left-hand electrodes of mercury switch 52, wire 124, switch arm 57, and contact 59 to wire 125. The wire 125 is connected by wires 126 and 127 to the center tap of the corrector resistance 101 of the differential controller 30. This wire 125 is also connected by wire 126, rheostat 128 and wire 129 to the slider 112 of thermostat 32. Wire 125 is also connected to slider 79 of flow controller 36 by way of rheostat 130 and wire 131. Further, wire 125 is connected to slider 67 of the light load responsive device 37 by way of rheostat 132 and wire 133. It will be noted that terminal W of motor 24 is connected by wire 123 to a wire 134 which is connected to the left-hand ends of resistances 94 and 92 of differential thermostat 30, to the left-hand ends of resistances 108 and 115 of outdoor thermostats 31 and 32, to the right-hand end of resistance 34 and the left-hand end of resistance 80 of the flow controller 36 and to the left-hand ends of resistances 73 and 39 of the controller 37 through similar and equal resistances 134 and 135. The terminal B of the proportioning motor 24 is connected by a wire 133 to the right-hand ends of resistances 94 and 92 of differential thermostat 30, to the right-hand ends of resistances 108 and 115 of outdoor thermostats 31 and 32, to the left-hand end of resistance 34 and the right-hand end of resistance 80 of the flow controller 36 and to the right-hand ends of resistances 73 and 39 of the controller 37.

Assuming first that there is no weather load, that is, assuming that outside and inside temperatures are substantially equal at about 75° F., but with the outside total heat greater than the inside total heat, and assuming also that no people are occupying the conditioned space, no substantial amount of cooling will be necessary and consequently the return air temperature will be substantially the same as the discharge temperature. Under these conditions, mercury switch 52 will be in a position opposite to that shown and sliders 91, 107, 82 and 72 will be disconnected, the circuits thereto being broken at contact 62 of relay 38.

Starting now with the R terminal of motor 24, the circuit goes by way of wire 120, left-hand electrodes of mercury switch 52, wire 124, switch arm 57 and contact 59 of relay 38 to wire 125. At this point the circuit branches to a number of points. The lower branch goes through manual rheostat 132 and wire 133 to slider 67 which is between the equal resistances 39 and 135. Another branch goes through rheostat 130 and wire 131 to slider 79 which is in the center of resistance 80. Another branch goes through rheostat 128 and wire 129 to slider 112 which is between the left-hand end and the center of resistance 115. The last branch goes through corrector resistance 101 to slider 93 which is at the right-hand end of resistance 94. The effective resistance or corrector resistance 101 under the conditions shown is about equal to the effective resistance of rheostat 128. Therefore, there is less resistance between terminals R and B than there is between terminals R and W by the amount of resistance 94. As a result, the fresh air damper will be completely closed.

From the description thus far it will be apparent that when there is no weather load on the building and also when there is no occupancy load, the return and discharge air temperature will be substantially the same due to there being no cooling load or heating load to carry. At such time if the controller 35 indicates it more advantageous to recirculate return air the damper motor is placed under the control of the differential controller 30 and the outside thermostat 32, these controls being so adjusted that the fresh air damper is completely closed when slider 93 engages the right-hand end of resistance 94. Now if the weather load on the building remains at zero but the space becomes occupied, cooling of the space will be necessary in order to remove the heat given off by the occupants. This heat will cause the return air temperature to rise and when it rises above 75° F., the thermostat 11 will begin opening the cooling valve 9. The cooling effect of the coil 7 will now cause the discharge temperature to become lower than the return air temperature, this causing slider 93 to move to the left across resistance 94. This will insert a portion of resistance 94 into circuit between terminals R and B and decrease the portion of resistance 94 which is connected between terminals R and W. This will cause the fresh air damper to be opened an amount proportionate to the differential in temperature between the return air and the discharge air. It will be apparent that in the absence of weather load for the conditioner to carry, the temperature differential between the discharge air and return air will vary in direct proportion to the number of occupants in the space. Thus if the number of occupants increases, more cooling will be necessary to maintain the space temperature at the desired value and the thermostat 11 will automatically open the coil valve 9 further for this purpose. This will in turn cause the differential between discharge and return air to increase a corresponding amount which causes the slider 93 to travel to the left across resistance 94 proportionately to the increase in occupancy. Thus as the occupancy in the space increases the fresh air damper is opened proportionately for thereby supplying fresh air to the space in accordance with the number of occupants in the space.

If the outside temperature rises, the cooling load on the space will then be a combination of the occupancy load and the weather load. In other words, as the outside temperature rises above the temperature maintained in the enclosure, heat will enter the enclosure by conduction and infiltration and the cooling coil in order to maintain a constant space temperature must remove both the heat given off by the occupants and the heat which leaks into the space from outside. Thus under such conditions, the differential in temperature between the discharge air and the return air is no longer a measure of the number of occupants in the space. Thus as the outside temperature increases, the differential between discharge and return air temperature will increase even though the occupancy remains constant. The outside thermostat 32 is provided for the purpose of compensating the system for these changes in outside temperature. It will be noted that as the outside temperature increases, the slider 112 of thermostat 32 will shift to the right across resistance 115 which decreases the portion of this resistance which is connected between terminals R and B and increases the portion of the resistance connected between terminals R and W. Thus the tendency of thermostat 32 upon rise in outside temperature is to close the fresh air damper. This tendency of thermostat 32 to close the damper upon rise in outside temperature counterbalances the tendency of the differential thermostat 30 to open the damper, due to increase in differential resulting from the increase in outside temperature. By properly adjusting the rheostat 128 which is in series with the slider 112 of thermostat 32, the effect of this thermostat may be made to just exactly counterbalance the effect of the differential controller 30 upon the fresh air damper due to rise in outside temperature. Consequently, if the occupancy of the space remains constant and outside temperature rises, the fresh air damper will remain stationary even though the differential in temperature between return air and discharge air increases. Stating the operation in another way, the differential thermostat 30 responds to the combined occupancy and weather load while the thermostat 32 responds only to the weather load and subtracts the effect of the weather load on the action of the differential thermostat 30 for thereby causing the differential thermostat 30 to control only in accordance with the actual occupancy load in the space.

For installations in which there is a material internal heat gain within the space due to lights or machinery, it is necessary to compensate the system for such internal heat gain. Thus if lights are placed into operation, the heat given off by such lights must be removed along with the occupancy heat and weather heat. Thus the heat given off by lights or similar equipment will cause the differential in temperature between the return and discharge air to increase, which would normally cause the fresh air damper to be opened wider. In order to compensate for this type of load, the electric power supply compensator 37 is provided. Upon an increase in lighting load in the space, the thermostat 11 will cause increase in operation of cooling coil 7 which will increase the differential between the discharge and return air, thus causing slider 93 to move further to the left across resistances 94 and 101. As previously described, this would operate to open wider the fresh air damper. However, at the same time the slider 67 is shifted to the right on resistance 39 by the power responsive device 70 which decreases the portion of resistance 73 connected between terminals R and B and increases the portion of this resistance connected between terminals R and W, which action tends to close the damper. By properly adjusting the rheostat 132, the controller 37 may be made to just exactly compensate for the effect of increased lighting load on the control system and thus cause the fresh air damper to remain stationary when the occupancy of the space remains constant but the lighting load changes.

In certain types of air conditioning systems, the volume of air delivered to the space may vary. This could result from dirty filters or the system might be of the type in which the volume of air delivered to the space is varied. Under such conditions, it is desirable to compensate the system for changes in such air flow. Thus if the volume of air discharged from the conditioner is lowered, the differential in temperature between the discharge and return air will increase even though the total load on the system remains exactly the same. This would cause the differential controller 30 to open the fresh air damper widely even though there is no change in occupancy. To avoid this result, the differential controller 36 is provided. When the flow of air through the conditioner decreases for any reason, the discharge temperature is reduced which causes slider 93 to move to the left on resistance 94 which would tend to open the fresh air damper 20. At the same time, this decrease in flow of air through the conditioner will cause the slider 79 of controller 36 to move to the right across resistance 80 which decreases the portion of this resistance between terminals R and B and increases the portion of this resistance between terminals R and W. By properly adjusting the rheostat 130 the action of controller 36 will just compensate for the effect of a decrease in air flow upon the control system and thus the fresh air damper will remain stationary even though the differential in temperature between the discharge and return air changes due to a variation in air flow. Since the flow is proportional to the square root of the pressure drop, the resistances 34 and 80 should be wound to give this result, or this can be accomplished in any of the other now well known manners.

Upon decrease in outside temperature, the weather load upon the conditioner will decrease which causes the thermostat 11 to decrease the action of cooling coil 7, which in turn causes the differential between discharge and return air to decrease which causes the controller 30 to tend to close the fresh air damper. This action however is opposed by the thermostat 32 which compensates the system for changes in outside temperature. Thus irrespective of whether outside temperature rises or lowers the fresh air damper is controlled in accordance with the occupancy load. Whenever the total heat of the outside air becomes less than that of the return air, as determined by the controller 35, the mercury switch 52 of this controller will be tilted for bridging its right-hand electrodes as shown. As previously described, this will cause the motor 24 to completely open the fresh air damper. Thus when cooling in the space is necessary and the outside air is cooler than the return air the control system of this invention takes control of the fresh air damper from the occupancy responsive control system and opens the fresh air damper wide.

Upon continued fall in outside temperature, the inside temperature will eventually fall to a point at which the thermostat 18 begins to open the heating valve 15 for heating the air supplied to the enclosure. At this time, the switch 64 of this thermostat closes and energizes the relay 38, which causes the switch arm 58 to engage contact 62.

With the system thus operating on the heating cycle there are certain conditions under which the total heat out of the outdoor air might be greater than the total heat of the air in the room. This might occur for example upon a rapid rise in outdoor temperature from a value less than 72° to a value greater than 72°. In the event that the total heat of the outdoor air is greater than the total heat of the inside air, the mercury switch 52 will be in the opposite position to that shown in the drawing so that the left-hand electrodes are bridged. Keeping in mind that the system is operating on the heating cycle so that relay 55 is energized, then under such conditions there is a circuit from terminal R of the motor 24 by way of wire 120, the left-hand electrodes of mercury switch 52, wire 124, switch arm 57 and contact 61 of the relay 38, wire 122 and wire 123 to the terminal W on the motor 24. In view of this short circuit between terminals R and W the fresh air damper will be wide open under this condition of winter operation with the total heat outside greater than the total heat inside. In this manner, outdoor air is used whenever possible for heating purposes during the heating cycle.

Most of the time during the heating cycle however the total heat outdoors will be less than that indoors. Under these conditions the mercury switch 52 will be in the position shown so that terminal R of motor 24 is connected to the contact 62 of relay 38 by a circuit which goes from terminal R through wire 120, right-hand electrodes of mercury switch 52, wire 121, switch arm 58 and contact 62 of the relay 38. With the relay 38 energized, the connection between switch arm 57 and contact 59 which connected the R terminal of motor 24 to the various sliders mentioned hereinabove during the summer operation of the system is broken so that these sliders have no effect on the operation of the system during the winter. The contact 62 which is connected to the terminal R of the motor 24 is connected to the remaining sliders of the various controllers. Contact 62 is connected to the slider 72 of the controller 37 through a manual rheostat 140 by means of wires 141, 142, 143 and 144. It is likewise connected to the slider 82 of the air flow controller 36 through the manual rheostat 145 by means of wires 141, 142, the rheostat 145 and a wire 146. It is further connected to the slider 107 of the thermostat 31 by wire 141, wire 147, manual rheostat 148 and wire 149. In addition, there is a circuit from contact 62 by way of wire 141, wire 147 and wire 150 to the corrector resistance 99 which in turn is contacted by the slider 91 of the controller 30.

Now assuming that the inside temperature is just at 72° so that the mercury switch 64 is closed and the apparatus is operating on its winter cycle, there will be no heat being furnished to the heating coil 13 under the control of thermostat 18 if the outdoor temperature is also at 72°. Under these conditions, and assuming that the air flow is at the desired value and that there is no light load, the slider 72 will be intermediate or between the equal resistances 73 and 134 so that it will have no effect upon the circuit. Likewise, the slider 82 of the flow controller will be intermediate resistance 34 and it will have no control on the circuit. The slider 91 will be at the left-hand end of resistance 92 as well as at the left-hand end of corrector resistance 99. Therefore, between terminals R and W there will be the small amount of resistance represented by the corrector resistance 99. The slider 107 on the other hand will be at or beyond the right-hand end of resistance 108 so that the only resistance between terminals R and B will be that of the adjustable rheostat 148. By properly adjusting this rheostat resistance so that it is less than the full left-hand side of corrector resistance 99, there will be less resistance between terminals R and B than there is between terminals R and W so that the fresh air damper will be closed.

Now assume that the outdoor temperature begins to fall. This will cause slider 107 to move towards the left along resistance 108 and insert more resistance between terminals R and B with the result that the fresh air damper will tend to open. However, this decrease in outdoor temperature throws a load on the system causing a reduction in room temperature so that thermostat 18 partly opens heating valve 15. The action of heating coil 13 therefore raises the discharge temperature above that of the return temperature. This increase in differential causes the slider 91 to move along the resistance 92 towards the right thereby inserting more resistance between the terminals R and W. This increase in resistance between the terminals R and W compensates for the increase in resistance inserted between terminals R and B so that the fresh air damper remains closed. As the outdoor temperature continues to fall, the thermostat 31 will continue to tend to open up the fresh air damper but the increased load on the system will cause the thermostat 18 to increase the supply of heat to heating coil 13 and this in turn increases the differential between the discharge and return air temperature so that differential controller 30 in turn tends to close the fresh air dampers whereupon they will remain in their closed position.

Now if some people should come into the space under control, they will give off heat which reduces the heating load on the system. During the summer, people coming into the room increase the cooling load but in the winter the opposite is true and the heating load is decreased. As a result, the thermostat 18 will cut down somewhat upon the supply of heat to the heating coil 13 and the differential between the discharge and return air temperatures will be reduced. Slider 91 will therefore start moving back towards the left so as to decrease the amount of resistance between the terminals R and W. Since there has been no corresponding change in outdoor temperature, the result will be to open the fresh air damper somewhat. In this manner, during the winter cycle whenever the occupancy within the space is increased, the fresh air damper will be opened in proportion thereto.

Now, if a light load should be placed on the system, this will add more heat to the space so that the thermostat 18 will cut down on the amount of heat being supplied to heater 13. As a result, the differential between the discharge and return air will be further reduced. The slider 91 will thereupon move towards the left along resistance 92 in an attempt to open the fresh air damper wider. At the same time however the slider 72 of controller 37 will move towards the right along resistance 73 and this will compensate for the reduction in differential between the discharge and return air temperatures so that the fresh air damper will remain in the position they were in.

If for any reason the flow of air through the system should be decreased, then it will become necessary to heat the air being discharged into the space to a higher temperature in order to maintain the desired temperature value in the space. This will increase the temperature differential and as a result controller 30 will tend to reduce the supply of fresh air. However, upon reduction in the flow of air, slider 82 will move from its center position to the right along resistance 34. It will be noted that the right hand end of resistance 34 is connected to the terminal W of the motor 24 so that such action by the slider 82 will tend to open the fresh air damper and thus compensate for the increase in temperature differential between the discharge and return air.

Summing up then, it will be seen that I have provided a combined summer and winter cooling and heating system fully automatic in operation wherein, through the means of a temperature differential controller responsive to the differential between the supply and return air, I position the fresh air dampers so as to take into the system varying amounts of fresh air in proportion to the occupancy load. This is accomplished by compensating the action of the differential temperature controller according to the load on the system by reason of the outdoor temperature conditions. In addition, I have provided means whereby the system is also compensated for such things as lighting load both in the summer and in the winter and is further compensated for changes in air flow through the air conditioning chamber. By this arrangement I am able to control the flow of fresh air in accordance with the occupancy load by the simple provision of thermostatic controllers and the like which respond to the various temperature conditions and temperature differentials within the system.

It will be obvious to those skilled in the art that many minor variations may be made without departing from the spirit of the present invention and I therefore intend to be limited only by the scope of the appended claims.

I claim as my invention:

1. In an air conditioning system for a space, in combination, a conditioner, means for withdrawing air from the space passing it through the conditioner and discharging it to said space, means for supplying fresh air to the space, flow control means for controlling the flow of fresh air, means for controlling the conditioner for maintaining a condition of the air in said space at a desired value, said condition being affected by the human occupancy of said space whereby the difference in values between said condition of the air withdrawn from said space and supplied to said space is a measure of the occupancy of the space, and means responsive to said difference in values of said condition for controlling said flow control means.

2. In an air conditioning system for a space, in combination, a conditioner for varying a condition of the air which affects its heat content, means for withdrawing air from the space passing it through the conditioner and discharging it to said space, means for supplying fresh air to the space, flow control means for controlling the flow of fresh air, means for controlling the conditioner for maintaining said condition of the air in said space at a desired value, said condition being affected by the human occupancy of said space and also by at least one other variable factor whereby the difference between the values of said condition of the air withdrawn from the space and supplied to said space varies with the occupancy of the space and said other factor, means including a device responsive to said difference in values of said condition for controlling said flow control means, and means responsive to said one other factor for compensating said device for variations in said other factor to thereby cause the flow control means to be controlled independently of variations in said other factor.

3. In an air conditioning system for a space, in combination, cooling means, means for passing a heat exchange fluid through said cooling means and into said space, means for controlling said cooling means in a manner to maintain the space temperature substantially constant whereby the temperature of the heat exchange fluid supplied to the space varies with the occupancy of the space, means for supplying fresh air to the space, flow control means for controlling the supply of fresh air, and means responsive to the temperature of the heat exchange fluid supplied to said space for controlling said flow control means.

4. In an air conditioning system for a space, in combination, cooling means, means for passing a heat exchange fluid through said cooling means and supplying it to said space, means for returning fluid from said space to said cooling means, means for controlling said cooling means in a manner to maintain the space temperature substantially constant whereby the difference in temperature between the supplied and returning heat exchange fluid varies with the occupancy of said space, means for supplying fresh air to said space, flow control means for controlling the supply of fresh air, and means responsive to the difference in temperature between the supplied and returning heat exchange fluid for controlling said flow control means.

5. In an air conditioning system for a space, in combination, cooling means, means for passing a heat exchange fluid through said cooling means and into said space, means for controlling said cooling means in a manner to maintain the space temperature substantially constant whereby the temperature of the heat exchange fluid supplied to the space varies with the occupancy of the space and also with at least one other variable factor, means for supplying fresh air to the space, flow control means for controlling the supply of fresh air, means including a device responsive to the temperature of the heat exchange fluid supplied to the space for controlling said flow control means, and means responsive to said other factor for compensating for said other factor for thereby causing the flow control means to be controlled independently of variations in said other factor.

6. In an air conditioning system for a space, in combination, cooling means, means for passing a heat exchange fluid through said cooling means and into said space, means for controlling said cooling means in a manner to maintain the space temperature substantially constant whereby the temperature of the heat exchange fluid supplied to the space varies with the occupancy of the space and also with outside temperature, means for supplying fresh air to the space, flow control means for controlling the supply of fresh air, means including a device responsive to the temperature of the heat exchange fluid supplied to said space for controlling said flow control means, and means responsive to outside temperature for compensating said device to thereby cause said flow controller to be controlled in accordance with the occupancy of said space.

7. In an air conditioning system for a space, in combination, cooling means, means for passing a heat exchange fluid through said cooling means and into said space, means for supplying fresh air to the space, flow control means for controlling the flow of fresh air, means including a device responsive to the temperature of the heat exchange medium flowing to the space for controlling said flow control means in a manner to increase the flow of fresh air upon fall in said temperature, and means responsive to outside temperature for also controlling said flow control means in a manner to increase the flow of fresh air upon decrease in outside temperature while the outside temperature is such as to indicate a cooling load on the system.

8. In an air conditioning system for a space, in combination, cooling means, means for passing a heat exchange fluid through said cooling means and supplying it to said space, means for returning fluid from said space to said cooling means, means for controlling said cooling means in a manner to maintain the space temperature substantially constant whereby the difference in temperature between the supplied and returning heat exchange fluid varies with the occupancy of said space and also with outside temperature, means for supplying fresh air to the space, flow control means for controlling the flow of fresh air, temperature responsive means responsive to the difference in temperature between the supplied and returning heat exchange fluid for controlling said flow control means, and outside temperature responsive means for compensating said temperature responsive means for variations in outside temperature.

9. In an air conditioning system for a space, in combination, heating means, means for passing a heat exchange fluid through said heating means and supplying it to said space, means for controlling the heating means in a manner to maintain the space temperature substantially constant whereby the temperature of the heat exchange fluid supplied to said space varies with the occupancy of said space and outside temperature, means for supplying fresh air to the space, a flow controller for controlling the supply of fresh air, means including a thermostat responsive to the temperature of heat exchange fluid supplied to said space for controlling said flow control means to increase the supply of fresh air upon a decrease in the temperature of the heat exchange fluid supplied to said space, and means responsive to outside temperature to compensate said thermostat for causing it to control the flow of fresh air in accordance with the occupancy of said space.

10. In an air conditioning system for a space, in combination, heating means, means for passing heat exchange fluid through said heating means and supplying it to said space, means for controlling the heating means in a manner to maintain the space temperature substantially constant, means for supplying fresh air to said space, a flow controller for controlling the supply of fresh air, and means including a thermostat responsive to the temperature of the heat exchange fluid passing to the space in a manner to increase the flow of fresh air upon fall in said temperature.

11. In an air conditioning system for a space, in combination, heating and cooling means, means for passing heat exchange fluid through said heating and cooling means and supplying it to said space, means for graduatingly controlling the heating and cooling means in a manner to maintain the temperature in the space between values suitable for human occupancy whereby the temperature of the heat exchange fluid supplied to said space varies with the occupancy of said space and also with outside temperature, means for supplying fresh air to said space, flow control means for controlling the flow of fresh air, thermostatic means responsive to the temperature of the heat exchange fluid supplied to said space for controlling said flow control means, means operated by said thermostatic means to increase the supply of fresh air upon a decrease in the temperature of the heat exchange fluid supplied to said space when said heat exchange fluid is being either heated or cooled, and means responsive to outside temperature for compensating said themostatic means in a manner to cause it to tend to decrease the supply of fresh air upon an increase in outdoor temperature whereby the flow of fresh air is controlled independently of outside temperature.

12. In an air conditioning system for a space, in combination, heating and cooling means, means for withdrawing air from said space, passing it through said heating and cooling means and supplying it to said space, means for graduatingly controlling the heating and cooling means in a manner to maintain the temperature in said space between values suitable for human occupancy whereby the difference in temperature between the air withdrawn and supplied to said space varies with the occupancy of said space and also with outside temperature, means for supplying fresh air to the space, flow control means for controlling the flow of fresh air, thermostatic means responsive to the difference in temperature between the air supplied to and withdrawn from said space for controlling said flow control means, and means responsive to outside temperature for compensating said thermostatic means for causing the flow of fresh air to be varied with the occupancy of said space.

13. In an air conditioning system for a space, in combination, heating and cooling means, means for passing heat exchange fluid through said heating and cooling means and supplying it to said space, means for graduatingly controlling the heating and cooling means in a manner to maintain the temperature in the space between values suitable for human occupancy whereby the temperature of the heat exchange fluid supplied to said space varies with the occupancy of said space and also with outside temperature, means for supplying fresh air to said space, flow control means for controlling the flow of fresh air, thermostatic means responsive to the temperature of the heat exchange fluid supplied to said space for controlling said flow controlling means, means responsive to outside temperature for compensating said thermostatic means for causing the flow of fresh air to be varied with the occupancy of said space, differential means responsive to the difference in heat content between the air outside and in the space, and means controlled by said differential means for increasing the flow of fresh air to a maximum when the heat content of the outside air is lower than the inside when cooling is required or when the heat content of the outside air is higher than the inside air when heating is required.

14. In an air conditioning system, in combination, heating and cooling means for heating or cooling a space, thermostatic means for controlling said heating and cooling means to maintain the temperature in said space between predetermined values, means for supplying fresh air to the space, flow control means for controlling the supply of fresh air, means responsive to the occupancy in said space for normally controlling said flow control means in a manner to increase the flow of fresh air upon increase in occupancy, and thermostatic means responsive to the difference between inside and outside temperatures for increasing the flow of fresh air to a maximum when outside temperature is lower than inside temperature when cooling is required and when outside temperature is higher than inside temperature when heating is required.

15. In an air conditioning system for cooling a space, in combination, means for supplying fresh air to said space, flow control means for controlling the supply of fresh air to said space, means responsive to the occupancy of said space for controlling said flow control means in a manner to increase its flow of fresh air upon increase in occupancy of the space, and means controlling said flow control means conjointly with said occupancy responsive means in a manner to increase the flow of fresh air to a maximum irrespective of the occupancy when outside air is cooler than the air in said space.

16. In an air conditioning system for a space, in combination, a conditioning chamber, means for circulating air through said chamber and space successively and recirculating it to said chamber, conditioning means in said chamber for varying a condition of the air which is affected by the human occupancy of said space, means responsive to said condition of the air in said space for controlling said conditioning means to maintain said condition of the air in said space at desired values, means supplying fresh air to said space, and means responsive to said condition of the air delivered to said space for controlling the fresh air supplying means in a manner to increase the supply of fresh air when said condition of the air delivered to said space decreases.

17. In an air conditioning system for a space, in combination, a conditioning chamber, means for circulating air through said chamber and space successively and recirculating it to said chamber, conditioning means in said chamber for varying a condition of the air which is affected by the human occupancy of said space, means responsive to said condition of the air in said space for controlling said conditioning means to maintain said condition of the air in said space at desired values, means supplying fresh air to said space, means responsive to said condition of the air delivered to said space for controlling the fresh air supplying means in a manner to increase the supply of fresh air when said condition of the air delivered to said space decreases, the condition of the air delivered to said space being affected by another factor, and means compensating said last named condition responsive means for said other factor.

ALWIN B. NEWTON.